Figure 1:
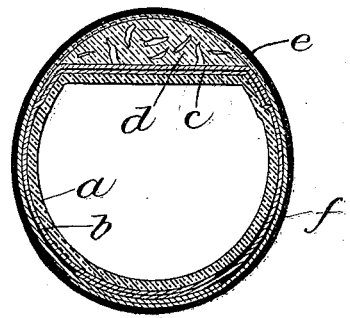

No. 618,395. Patented Jan. 31, 1899.
G. H. CLARK.
PNEUMATIC WHEEL TIRE.
(Application filed Apr. 8, 1898.)
(No Model.)

Witnesses:
Inventor:
Geo. H. Clark

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 618,395, dated January 31, 1899.

Application filed April 8, 1898. Serial No. 676,883. (No model.)

*To all whom it may concern:*

Be it known that I, GEORGE H. CLARK, of Boston, county of Suffolk, and State of Massachusetts, have invented an Improvement in Pneumatic Wheel-Tires, of which the following description, in connection with the accompanying drawings, is a specification, like letters on the drawings representing like parts.

The pneumatic wheel-tire shown in my application for Letters Patent, Serial No. 652,452, comprises, essentially, an air-tube and a tread-strip at the tread side of said air-tube, which is incorporated into and forms a part of the tire, said strip serving as a protecting-strip to provide against puncturing the air-tube, and in practice said tread-strip is made of cork.

Cork in its natural state is more or less cellular or porous, and the cheaper qualities are more cellular or porous than the costly qualities, and in practice I have found in manufacturing the tire that the rubber composing the air-tube enters the cells or pores of the cork, more particularly when the tire is being first blown up prior to being vulcanized, yet also during the process of vulcanization, and in many instances an imperfect or leaky air-tube is the result, which of course destroys the commercial value of the tire, and I have also found in practice that when the cells or pores of the cork have thus become filled with rubber the cork strip is materially stiffened and weighted, and as a consequence it will less readily respond to compression, while its increased weight is disadvantageous. Furthermore, I have found in practice that the rubber composing the outer covering also enters the cells or pores of the cork, which likewise stiffens and weights the cork strip, and although the rubber composing the outer covering is not usually of the same quality as the rubber composing the air-tube, yet its effect on the cork strip is substantially the same.

This invention has for its object to improve the construction of a pneumatic wheel-tire having a cellular or porous tread-strip at the tread side of the air-tube, whereby the rubber which forms the essential element of the tire is prevented from entering the cells or pores of said tread-strip, especially the rubber composing the air-tube, thereby enabling the production of a pneumatic wheel-tire having vulcanized in it at the tread side of the air-tube a cellular or porous tread-strip— *i. e.*, a tread-strip provided with numerous air-cells.

In carrying out this invention a substantially imperforate strip of material is interposed between the air-tube and the cellular or porous tread-strip which effectually prevents the rubber composing the air-tube from entering the cells or pores of said tread-strip, and another substantially imperforate strip of material is interposed between said cellular or porous tread-strip and the outer covering which likewise effectually prevents the rubber composing the outer covering from entering the cells or pores of said tread-strip. The substantially imperforate strip which is interposed between the tread-strip and the air-tube may be composed of a narrow strip of closely-woven canvas made as wide or wider than the tread-strip, or it may be made wide enough to entirely inclose the air-tube, and in such case to serve as a sheath therefor, and the substantially imperforate strip which is interposed between the tread-strip and the outer covering may likewise be made of any suitable width. Closely-woven strips of canvas may be employed as the substantially imperforate strips, and to render them substantially imperforate they may be treated upon one or both sides with a coating of rubber or rubber compound, which is worked into the strips—as, for instance, with heavy rolls—yet said strips may be made imperforate in any other suitable way so far as my invention is concerned. It is only necessary to render the strips imperforate for that portion of their width equal to the width of the tread-strip, yet of course they may be rendered imperforate for their entire width. Either or both substantially imperforate strips may be used, but I prefer to use both. The aforesaid parts are vulcanized together. My invention, however, is not limited to the employment of a substantially imperforate strip to produce the results desired, as I desire to broadly include within the scope of this invention any means whereby the rubber is prevented from entering the cells or pores of the tread-strip. I prefer, however, to use a strip or strips which are constructed or rendered substantially imperforate, because said strips may be made non-extensible, and thereby used to reinforce and strengthen the tread-strip and keep it from extending or stretching when the tire is inflated.

In my application above referred to the tread-strip is secured to a non-extensible strip of material and is thereby prevented from stretching when the tire is inflated, and my present invention is also intended to include such a non-extensible strip of material when rendered substantially imperforate, whereby the results herein sought may be obtained.

Figure 3:
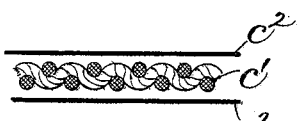
Figure 4:
Figure 5:
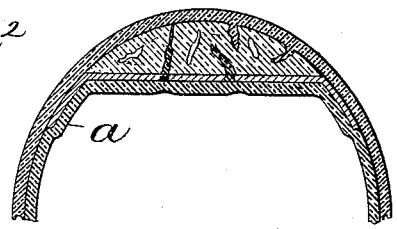
Figure 2:
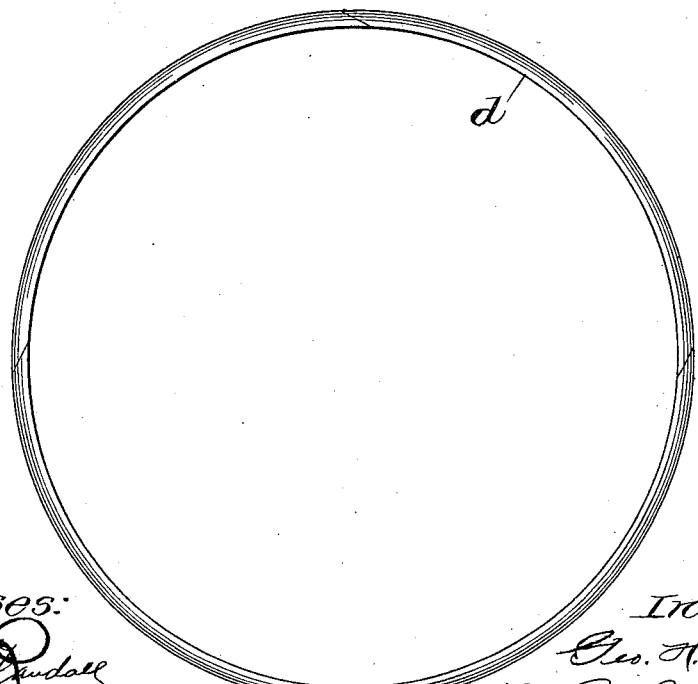

Figure 1 shows a cross-section of a pneumatic wheel-tire embodying this invention. Fig. 2 is a side view, on a smaller scale, of the circular cellular or porous tread-strip. Fig. 3 is a detail showing a strip of material and means employed for rendering said strip substantially imperforate. Fig. 4 is a detail showing said strip of material, a portion of which is rendered substantially imperforate; and Fig. 5 shows a cross-section of a portion of a cellular or porous tread-strip, showing rubber contained in the cells or pores thereof, which materially stiffens and weights the strip.

$a$ represents the air-tube, which may be formed upon a mandrel, if desired. $b$ represents a sheath or covering inclosing said air-tube, which is preferably made of textile material and more or less extensible—as, for instance, it may be composed of a strip of textile material cut off on the bias. $c$ represents a substantially imperforate strip, which is disposed at the tread side of the air-tube $a$. $d$ is the tread-strip of cork or other cellular or porous material. $e$ represents a sheath or covering inclosing the aforesaid parts, and $f$ the outer covering. These parts are all attached together by cement and may be secured by vulcanization, yet so long as they are attached together, and thereby held in fixed relation to each other, the purposes of this invention are accomplished.

The substantially imperforate strip $c$ may be composed of textile material—as closely-woven canvas, for instance—coated with rubber or rubber compound on one or both sides, which is worked into said strip by pressure in such way as to render it substantially imperforate, yet my invention is not limited to rendering the strip substantially imperforate in this particular way. In Fig. 3, $c'$ represents the closely-woven fabric, and $c^2$ layers of rubber which are to be incorporated in the fabric by heavy pressure, producing a substantially imperforate strip. (See Fig. 4.)

The imperforate strip $c$ is interposed between the cork tread-strip and the air-tube and will effectually prevent the rubber composing said air-tube from being blown into or otherwise caused to enter the cells or pores of the cork. It is obvious that this imperforate strip $c$ may be disposed contiguous to the air-tube—that is, between the air-tube and the expansible sheath $b$—and substantially the same results will be produced, it only being necessary that said imperforate strip shall be placed between the air-tube and cork strip.

It is obvious that the imperforate strip $c$ may be made as wide as desired, and while herein shown as made a little wider than the cork tread-strip I desire it to be understood that said strip $c$ may be made of any width and even may completely inclose the air-tube. I desire also to have it understood that it is only essential that the imperforate strip $c$ shall be made imperforate along that portion of its width between the air-tube and cork tread-strip. Consequently the remaining portion or portions of said strip $c$ need not be thus made imperforate, and if said strip should completely inclose the air-tube of course only that portion of it opposite or beneath the cork tread-strip need be made imperforate. In any event such imperforate strip or imperforate portion of a strip or other means interposed between the air-tube and cork tread-strip, whereby the rubber will be prevented from entering the cells or pores of the cork, comes within the spirit and scope of this invention.

The sheath $e$ is also made of closely-woven canvas, and that portion of it contiguous the tread-strip $d$ is made substantially imperforate—as, for instance, it may be rendered substantially imperforate in the same manner as the strip $c$ above referred to, and said sheath or that portion of it which is made substantially imperforate will effectually prevent the rubber of the outer covering from entering the cells or pores of the tread-strip.

Believing myself to be the first to provide any means whereby the rubber is prevented from entering the cells or pores of a cellular or porous tread-strip, I hence broadly claim it. The strip $c$, if made non-extensible, will prevent the tread-strip $d$ from being stretched when the tire is inflated, and as such a result is important I prefer to make the strip $c$ non-extensible.

I claim—

1. In a pneumatic wheel-tire, an air-tube, a cellular or porous tread-strip at the tread side thereof, and means interposed between said air-tube and tread-strip for preventing the rubber composing the air-tube from entering the cells or pores of said tread-strip, said parts being attached together, substantially as described.

2. In a pneumatic wheel-tire, an air-tube, a cellular or porous tread-strip at the tread side thereof, and a substantially imperforate strip interposed between said air-tube and tread-strip, which prevents the rubber composing said air-tube from entering the cells or pores of said tread-strip, said parts being attached together, substantially as described.

3. In a pneumatic wheel-tire, an air-tube, a tread-strip at the tread side thereof having numerous air-cells and a non-extensible strip of textile material made substantially imperforate interposed between said air-tube and tread-strip, said parts being attached together, substantially as described.

4. In a pneumatic wheel-tire, an air-tube, a cellular or porous tread-strip at the tread side of it and an outer covering, means interposed between said tread-strip and air-tube for preventing the rubber composing the air-tube from entering the cells or pores of said tread-strip and means interposed between said tread-strip and the outer covering for preventing the rubber composing the outer covering from entering the cells or pores of said tread-strip said parts being attached together, substantially as described.

5. In a pneumatic wheel-tire, an air-tube, a cellular or porous tread-strip at the tread side of it and an outer covering and a substantially imperforate sheath inclosing said air-tube and tread-strip thereon which is contained within said outer covering, substantially as described.

6. In a pneumatic wheel-tire, a cellular or porous tread-strip at the tread side of the air-tube, and a substantially imperforate tubular jacket inclosing said tread-strip and secured thereto, substantially as described.

7. In a pneumatic wheel-tire, an air-tube, a substantially imperforate jacket in which it is inclosed, a cellular or porous tread-strip at the tread side of said inclosed air-tube, and an outer covering, said parts being attached together, substantially as described.

In testimony whereof I have signed my name to this specification in the presence of two subscribing witnesses.

GEO. H. CLARK.

Witnesses:
B. J. NOYES,
JENNIE L. HUTCHINSON.